(12) United States Patent
Washio

(10) Patent No.: US 7,805,304 B2
(45) Date of Patent: Sep. 28, 2010

(54) SPEECH RECOGNITION APPARATUS FOR DETERMINING FINAL WORD FROM RECOGNITION CANDIDATE WORD SEQUENCE CORRESPONDING TO VOICE DATA

(75) Inventor: Nobuyuki Washio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1107 days.

(21) Appl. No.: 11/475,003

(22) Filed: Jun. 27, 2006

(65) Prior Publication Data

US 2007/0225982 A1 Sep. 27, 2007

(30) Foreign Application Priority Data

Mar. 22, 2006 (JP) ............................. 2006-079052

(51) Int. Cl.
*G10L 15/00* (2006.01)
*G10L 15/20* (2006.01)
*G10L 15/04* (2006.01)

(52) U.S. Cl. .................. 704/257; 704/233; 704/253

(58) Field of Classification Search ............ None
See application file for complete search history.

(56) References Cited

U.S. PATENT DOCUMENTS 5,848,388 A * 12/1998 Power et al. ............... 704/239
6,157,911 A * 12/2000 Kuroda ..................... 704/251
2004/0186819 A1 * 9/2004 Baker ........................ 707/1
2005/0216264 A1 * 9/2005 Attwater et al. ........... 704/239
2006/0241948 A1 * 10/2006 Abrash et al. .............. 704/275

FOREIGN PATENT DOCUMENTS

| JP | 8-115093 | 5/1996 |
|---|---|---|
| JP | 2005-17932 | 1/2005 |

* cited by examiner

*Primary Examiner*—Brian L Albertalli
(74) *Attorney, Agent, or Firm*—Kratz, Quintos & Hanson, LLP

(57) ABSTRACT

A speech recognition apparatus and a method are provided in which even when a speech recognition grammar is employed independently or alternatively, speech recognition response is improved. Voice data is received. Then, an output suspended state for a speech recognition result is maintained until the duration of a silence interval that follows the utterance part reaches a criterion time. Information indicating whether a last word of a word sequence is a final word is stored. On the basis of the language model, a recognition candidate word sequence is extracted. When the last word of the extracted word sequence is determined as being a final word, the speech recognition result is output in a time shorter than the criterion time, while when determined as not being a final word, the speech recognition result is output at the time that the criterion time has elapsed.

14 Claims, 11 Drawing Sheets

F I G. 1
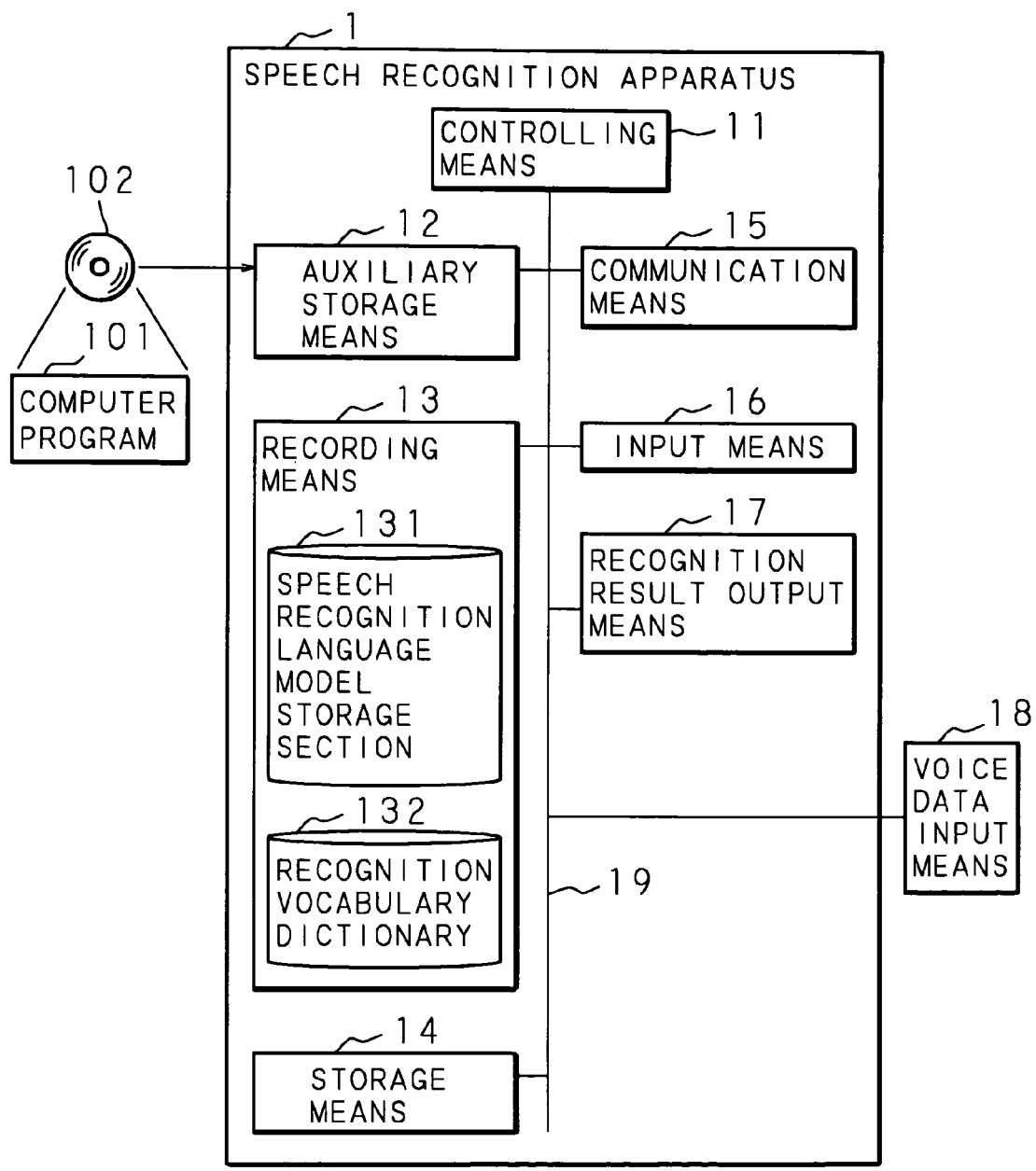

F I G. 4

| SURNAME | GIVEN NAME | FINAL FLAG |
|---|---|---|
| Yamada | | 0 |
| | Ichiro | 1 |
| Tanaka | | 0 |
| | Taro | 1 |
| ⋮ | ⋮ | ⋮ |

FIG. 11

```xml
<?xml version="1.0" encoding="Shift_JIS" ?>
<grammar xmlns="http://www.w3.org/2001/06/grammar" version="1.0"
 mode="voice" xml:lang="en" tag-format="semantics/1.0" root="seimei">

<rule id="seimei" scope="private">
                        <tag>SLOT_SEI=""</tag>
                        <tag>SLOT_MEI=""</tag>
                        <one-of>
                                    <item>
                                                <ruleref uri="#sei"/>
                                                <tag>SLOT_SEI = $$</tag>
                                                <ruleref uri="#mei"/>
                                                <tag>SLOT_MEI = $$</tag>
                                    </item>
                                    <item>
                                                <ruleref uri="#sei"/>
                                                <tag>SLOT_SEI = $$</tag>
                                    </item>
                                    <item>
                                                <ruleref uri="#mei"/>
                                                <tag>SLOT_MEI = $$</tag>
                                    </item>
                        </one-of>
            </rule>

<rule id="sei" scope="public">
                        <one-of>
                                    <item><tag>'Yamada'</tag>yamada</item>
                                    <item><tag>'Tanaka'</tag>tanaka</item>
                        </one-of>
            </rule>

<rule id="mei" scope="public">
                        <one-of>
                                    <item><tag>'Ichiro'</tag>ichiro</item>
                                    <item><tag>'Taro'</tag>taro</item>
                        </one-of>
            </rule>

</grammar>
```

SPEECH RECOGNITION APPARATUS FOR DETERMINING FINAL WORD FROM RECOGNITION CANDIDATE WORD SEQUENCE CORRESPONDING TO VOICE DATA

CROSS-REFERENCE TO RELATED APPLICATIONS

This Nonprovisional application claims priority under 35 U.S.C. §119(a) on Patent Application No. 2006-079052 filed in Japan on Mar. 22, 2006, the entire contents of which are hereby incorporated by reference.

BACKGROUND OF THE INVENTION

The present invention relates to a speech recognition apparatus, a speech recognition method, a recording medium recorded a computer program for receiving a voice input, then recognizing the voice, and then outputting a recognition result.

With progress in speech recognition technology, a wide variety of speech recognition systems have been developed such as voice portals and car navigation systems. Such a prior art speech recognition system employs a speech recognition engine for connected word recognition, isolated word recognition, and the like, and thereby outputs a speech recognition result or alternatively executes an application using the speech recognition result.

For example, in a prior art speech recognition apparatus employing a speech recognition engine for connected word recognition, its controlling means calculates the power of a received voice at every instance and then compares the calculated power of the voice with a predetermined threshold. Then, at the time point that the power has continued to exceed the threshold for a predetermined time, acoustic analysis is performed at every instance for extracting characteristic parameters of the received voice, so that a matching score for each recognition candidate word sequence is calculated on the basis of the acoustic analysis result and a language model such as a grammar and an N-gram. Then, one or a plurality of word sequences serving as a recognition result is acquired on the basis of the matching score.

When a speech recognition engine is used, accurate utterance detection is important. In particular, in connected word recognition, in order that an "inter-word pause" and a "silence after completion of an utterance" should not be confused with each other, a "criterion time" is set up into a predetermined time length. Then, a detected silence interval is compared with the set-up criterion time so that when the silence interval exceeds the criterion time, it is determined as being completion of the utterance.

For example, Japanese Patent Application Laid-Open No. 2005-017932 discloses a speech recognition apparatus provided with a function of acquiring voice data containing consecutive words uttered and inputted by a user and then detecting completion of the utterance inputted by the user when a silence interval greater than or equal to an utterance completion pause time having a predetermined time length is detected in the recognition of the acquired voice data, wherein the utterance completion pause time is determined in accordance with the accuracy in the detection of the termination point of the utterance inputted by the user. The technique disclosed in Japanese Patent Application Laid-Open No. 2005-017932 allows a "separation for completion of an utterance" to be determined with high accuracy in accordance with the accuracy in the detection of the termination point of an utterance by a user.

Japanese Patent Application Laid-Open No. H08-115093 discloses an utterance completion detection method of determining completion of an utterance on the basis of the matching score of a sentence segment as well as a syntactic analysis result which are obtained from a result of matching of an input voice with word standard patterns; and the duration length of an input voice determined as being in agreement with a silence standard pattern. For example, it is determined as being a time point of completion of an utterance when the matching score of a sentence segment accepted by syntax rules is the maximum among the matching scores of all sentence segments while the duration length of an input voice determined as being in agreement-with a silence standard pattern is greater than or equal to a predetermined time defined in advance.

BRIEF SUMMARY OF THE INVENTION

The present invention has been devised in view of this situation. An object of the present invention is to provide a speech recognition apparatus, a speech recognition method, and a recording medium recorded a computer program in which even when a speech recognition grammar is employed independently or alternatively even when an isolated word recognition grammar is employed together, the time point of completion of an utterance is identified at an early stage so that speech recognition response is improved.

In order to achieve the above-mentioned object, a speech recognition apparatus according to a first invention is a speech recognition apparatus for receiving voice data and then maintaining an output suspended state for a speech recognition result until duration of a silence interval that follows an utterance part reaches a criterion time for determining completion of the utterance, comprising: language model storage means for storing information concerning a language model; storage means for storing a recognition candidate word sequence changed on the basis of a speech recognition grammar, and information indicating whether a last word of a word sequence is a final word; recognition candidate extracting means for extracting a recognition candidate word sequence corresponding to the received voice data, on the basis of said language model; final word determination means for determining whether a word at an utterance last end is a final word, from the extracted recognition candidate word sequence; and recognition result output means for outputting a speech recognition result in a time shorter than said criterion time when determined as being a final word, and outputting a speech recognition result in case that new voice data is not present within said criterion time when determined as not being a final word.

Here, the final word indicates a word that is always located at the last end (word sequence end) in all word sequences acceptable by a grammar. Further, in the determination of whether a final word or not, homonyms may be treated as if the same word. Furthermore, words having the same reading and spelling but located at grammatically different positions may be distinguished.

A speech recognition apparatus according to a second invention is the speech recognition apparatus according to the first invention, comprising: means for determining whether the recognition candidate word sequence extracted by said recognition candidate extracting means is updated; recognition candidate output means for outputting said recognition candidate word sequence when determined as being updated;

means for determining whether duration of a silence interval has reached said criterion time; and means for outputting a recognition candidate word sequence at the time point of reaching when determined as having reached.

A speech recognition apparatus according to a third invention is a speech recognition apparatus for receiving voice data and then maintaining an output suspended state for a speech recognition result until duration of a silence interval that follows an utterance part reaches a criterion time for determining completion of the utterance, comprising: language model storage means for storing information concerning a language model; means for storing a recognition vocabulary included in said language model, classified in word groups; means for storing a last word of a recognition candidate word sequence, related to one of the word groups; means for storing probability of becoming a final word, for each of said word groups; recognition candidate extracting means for extracting a recognition candidate word sequence corresponding to the received voice data, on the basis of said language model; means for changing said criterion time on the basis of the probability that the last word of the extracted recognition candidate word sequence becomes the final word of the corresponding word group; and recognition result output means for outputting a speech recognition result when new voice data is not present within said criterion time.

A speech recognition apparatus according to a fourth invention is a speech recognition apparatus for receiving voice data and then maintaining an output suspended state for a speech recognition result until duration of a silence interval that follows an utterance part reaches a criterion time for determining completion of the utterance, comprising: language model storage means for storing information concerning a language model; means for storing a recognition vocabulary included in said language model, classified in word groups; means for storing a last word of a recognition candidate word sequence, related to one of the word groups; means for storing said criterion time for each of said word groups; recognition candidate extracting means for extracting a recognition candidate word sequence corresponding to the received voice data, on the basis of said language model; and recognition result output means for outputting a speech recognition result when new voice data is not present within the criterion time of the word group corresponding to the last word of the extracted recognition candidate word sequence.

A speech recognition method according to a fifth invention is a speech recognition method of receiving voice data and then maintaining an output suspended state for a speech recognition result until duration of a silence interval that follows an utterance part reaches a criterion time for determining completion of the utterance, comprising the steps of storing information concerning a language model; storing a recognition candidate word sequence changed on the basis of a speech recognition grammar, and information indicating whether a last word of a word sequence is a final word; extracting a recognition candidate word sequence corresponding to the received voice data, on the basis of said language model; determining whether a word at an utterance last end is a final word, from the extracted recognition candidate word sequence; and outputting a speech recognition result in a time shorter than said criterion time when determined as being a final word, and outputting a speech recognition result in case that new voice data is not present within said criterion time when determined as not being a final word.

A speech recognition method according to a sixth invention is a speech recognition method of receiving voice data and then maintaining an output suspended state for a speech recognition result until duration of a silence interval that follows an utterance part reaches a criterion time for determining completion of the utterance, comprising the steps of storing information concerning a language model; storing a recognition vocabulary included in said language model, classified in word groups; storing a last word of a recognition candidate word sequence, related to one of the word groups; storing probability of becoming a final word, for each of said word groups; extracting a recognition candidate word sequence corresponding to the received voice data, on the basis of said language model; changing said criterion time on the basis of the probability that the last word of the extracted recognition candidate word sequence becomes the final word of the corresponding word group; and outputting a speech recognition result when new voice data is not present within said criterion time.

A speech recognition method according to a seventh invention is a speech recognition method of receiving voice data and then maintaining an output suspended state for a speech recognition result until duration of a silence interval that follows an utterance part reaches a criterion time for determining completion of the utterance, comprising the steps of: storing information concerning a language model; storing a recognition vocabulary included in said language model, classified in word groups; storing a last word of a recognition candidate word sequence, related to one of the word groups; storing said criterion time for each of said word groups; extracting a recognition candidate word sequence corresponding to the received voice data, on the basis of said language model; and outputting a speech recognition result when new voice data is not present within the criterion time of the word group corresponding to the last word of the extracted recognition candidate word sequence.

A recording medium recorded a computer program according to an eighth invention is a computer program that is capable of causing a computer to receive voice data and then maintain an output suspended state for a speech recognition result until duration of a silence interval which follows an utterance part reaches a criterion time for determining completion of the utterance, and that causes said computer to serve as: language model storage means for storing information concerning a language model; storage means for storing a recognition candidate word sequence changed on the basis of a speech recognition grammar, and information indicating whether a last word of a word sequence is a final word; recognition candidate extracting means for extracting a recognition candidate word sequence corresponding to the received voice data, on the basis of said language model; final word determination means for determining whether a word at an utterance last end is a final word, from the extracted recognition candidate word sequence; and recognition result output means for outputting a speech recognition result in a time shorter than said criterion time when the final word determination means has determined as being a final word, and outputting a speech recognition result in case that new voice data is not present within said criterion time when determined as not being a final word.

A recording medium recorded a computer program according to a ninth invention is a computer program that is capable of causing a computer to receive voice data and then maintain an output suspended state for a speech recognition result until duration of a silence interval which follows an utterance part reaches a criterion time for determining completion of the utterance, and that causes said computer to serve as: language model storage means for storing information concerning a language model; means for storing a recognition vocabulary included in said language model, classified in word groups; means for storing a last word of a recognition candidate word sequence, related to one of the word groups; means for storing probability of becoming a final word, for each of said word groups; recognition candidate extracting means for extracting a recognition candidate word sequence corresponding to the received voice data, on the basis of said language model; means for changing said criterion time on the basis of the probability that the last word of the extracted recognition candidate word sequence becomes the final word of the corresponding word group; and recognition result output means for outputting a speech recognition result when new voice data is not present within said criterion time.

A recording medium recorded a computer program according to a tenth invention is a computer program that is capable of causing a computer to receive voice data and then maintain an output suspended state for a speech recognition result until duration of a silence interval which follows an utterance part reaches a criterion time for determining completion of the utterance, and that causes said computer to serve as: language model storage means for storing information concerning a language model; means for storing a recognition vocabulary included in said language model, classified in word groups; means for storing a word at a last end of a recognition candidate word sequence, related to one of the word groups; means for storing said criterion time for each of said word groups; recognition candidate extracting means for extracting a recognition candidate word sequence corresponding to the received voice data, on the basis of said language model; and recognition result output means for outputting a speech recognition result when new voice data is not present within the criterion time of the word group corresponding to the last word of the extracted recognition candidate word sequence.

In the first invention, the fifth invention, and the eighth invention, voice data is received, and then an output suspended state for a speech recognition result is maintained until the duration of a silence interval that follows the utterance part reaches a criterion time for determining completion of the utterance. Information concerning a language model is stored. Further stored are: a recognition candidate word sequence changed on the basis of a speech recognition grammar; and information indicating whether a last word of a word sequence is a final word. On the basis of the language model, a recognition candidate word sequence corresponding to the received voice data is extracted. Then, it is determined whether a word at an utterance last end is a final word, from the extracted recognition candidate word sequence. When determined as being a final word, the speech recognition result is output in a time shorter than the criterion time, while when determined as not being a final word, the speech recognition result is output when new voice data is not present within the criterion time. This permits reliable detection that the utterance included in the received voice data is an utterance corresponding to a final word, i.e., the last word of the utterance to be received. Thus, the speech recognition result can be output without unnecessary waiting time.

In the second invention, at each time that the extracted recognition candidate word sequence is updated, the recognition candidate word sequence is output to the outside. Then, when the duration of a silence interval reaches said criterion time, the recognition candidate word sequence at the time point of reaching is output. By virtue of this, regardless of detection that the utterance included in the received voice data is an utterance corresponding to a final word, i.e., the last word of the utterance to be received, the speech recognition result is output at an early stage. Thus, the speech recognition response is improved in appearance, except for the case that it has been detected as-being an utterance corresponding to a final word, i.e., the last word of the utterance to be received.

Further, in the case of not being an utterance corresponding to a final word, i.e., not being the last word of the utterance to be received, the output speech recognition result is updated so that the accuracy of the speech recognition result can be ensured.

In the third invention, the sixth invention, and the ninth invention, voice data is received, and then an output suspended state for a speech recognition result is maintained until the duration of a silence interval that follows the utterance part reaches a criterion time for determining completion of the utterance. Information concerning a language model is stored. The recognition vocabulary included in the language model is stored classified in word groups. The last word of the recognition candidate word sequence is stored related to one of the word group. Further, the probability of becoming a final word for each word group is stored. On the basis of the language model, a recognition candidate word sequence corresponding to the received voice data is extracted. Then, the criterion time is changed on the basis of the probability that the word at the last end of the extracted recognition candidate word sequence becomes the final word of the corresponding word group. Then, when new voice data is not present within the criterion time, the speech recognition result is output. By virtue of this, when an utterance is received that has a high probability of becoming an utterance corresponding to a final word, i.e., the last word of the utterance to be received, the speech recognition result is displayed or output in a shorter time. This improves the speech recognition response.

In the fourth invention, the seventh invention, and the tenth invention, voice data is received, and then an output suspended state for a speech recognition result is maintained until the duration of a silence interval that follows the utterance part reaches a criterion time for determining completion of the utterance. Information concerning a language model is stored. The recognition vocabulary included in the language model is stored classified in word groups. The last word of the recognition candidate word sequence is stored related to one of the word groups. Further, the criterion time for each word group is stored. On the basis of the language model, a recognition candidate word sequence corresponding to the received voice data is extracted. Then, when new voice data is not present within the criterion time of the word group corresponding to the last word of the extracted recognition candidate word sequence, the speech recognition result-is output. By virtue of this, the criterion time is set up shorter for an utterance having no subsequent new voice data and hence having a higher probability of becoming an utterance corresponding to a final word, i.e., the last word of the utterance to be received. This allows the waiting time to be adjusted on the basis of the criterion time set up for each word group corresponding to the word at the last end of a recognition candidate word sequence. This improves the speech recognition response.

According to the first invention, the fifth invention, and the eighth invention, reliable detection is achieved that the utterance included in the received voice data is an utterance corresponding to a final word, i.e., the last word of the utterance to be received. Thus, the speech recognition result can be output without unnecessary waiting time.

According to the second invention, regardless of detection that the utterance included in the received voice data is an utterance corresponding to a final word, i.e., the last word of the utterance to be received, the speech recognition result is output at an early stage. Thus, the speech recognition response is improved in appearance, except for the case that it has been detected as being an utterance corresponding to a final word, i.e., the last word of the utterance to be received.

Further, in the case of not being an utterance corresponding to a final word, i.e., not being the last word of the utterance to be received, the output speech recognition result is updated so that the accuracy of the speech recognition result can be ensured.

According to the third invention, the sixth invention, and the ninth invention, when an utterance is received that has a high probability of becoming an utterance corresponding to a final word, i.e., the last word of the utterance to be received, the speech recognition result is displayed or output in a shorter time. This improves the speech recognition response.

According to the fourth invention, the seventh invention, and the tenth invention, the criterion time is set up shorter for an utterance having no subsequent new voice data and hence having a higher probability of becoming an utterance corresponding to a final word, i.e., the last word of the utterance to be received. This allows the waiting time to be adjusted on the basis of the criterion time set up for each word group corresponding to the word at the last end of a recognition candidate word sequence. This improves the speech recognition response.

The above and further objects and features of the invention will more fully be apparent from the following detailed description with accompanying drawings.

BRIEF DESCRIPTION OF THE SEVERAL VIEWS OF THE DRAWINGS

FIG. 1 is a block diagram showing a configuration of a speech recognition apparatus according to Embodiment 1 of the present invention.

FIG. 4 is a diagram showing an example of a configuration of recognition vocabulary data.

FIG. 11 is a diagram showing an example of a person name grammar.

DETAILED DESCRIPTION OF THE INVENTION

Figure 2:
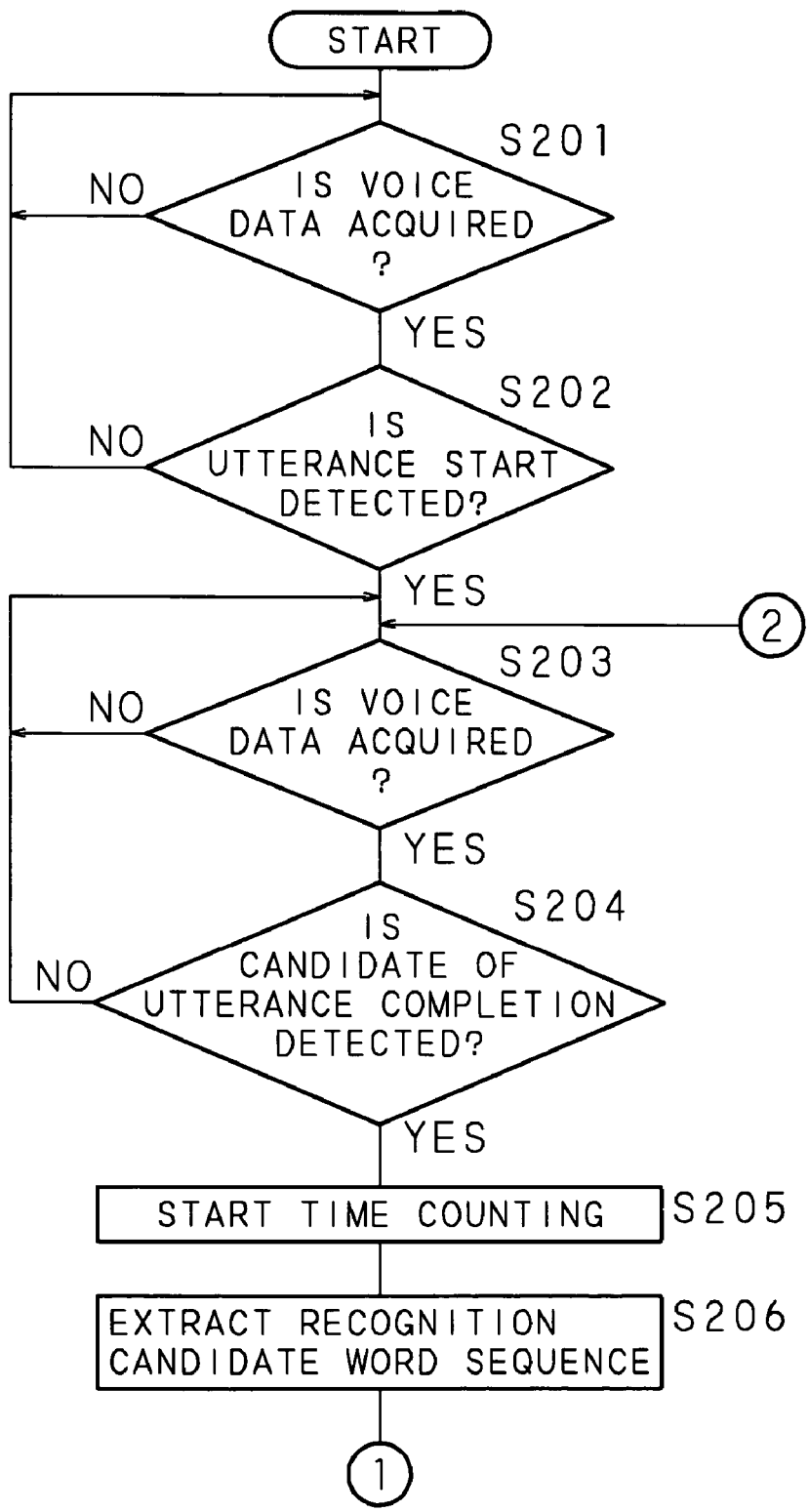
FIG. 2 is a flow chart showing a procedure of speech recognition processing performed by controlling means of a speech recognition apparatus according to Embodiment 1 of the present invention.

In each of the prior art speech recognition apparatuses described above, it is determined as being the time point of completion of an utterance when a silence time greater than or equal to a predetermined time is detected. FIG. 11 is a diagram showing an example of a person name grammar. Thus, in speech recognition employing a person name grammar that allows an utterance of a surname and a given name, a given name only, and a surname only as shown in FIG. 11, even when voice data containing an utterance of a given name only is inputted so that it is grammatically obvious that no word follows, it cannot be determined as being completion of the utterance, until a predetermined time elapses that is defined as a rather long time. This has caused a problem that the speech recognition response cannot be improved. This is because when the time before the determination of completion of the utterance is shortened in order to improve the speech recognition response, a concern arises that a silence interval between a surname and a given name could mistakenly be determined as completion of the utterance.

On the other hand, when a speech recognition engine for isolated word recognition such as a command grammar is solely employed, no word follows (no pause interval is possible). Thus, the time point of completion of a voice can be identified when a shorter silence interval is detected in comparison with the case that a speech recognition engine for connected word recognition is employed. However, when a speech recognition engine for connected word recognition is employed together (utilization in a so-called multi-grammar mode), similarly to the above-mentioned case, the time point of completion of an utterance need be determined by detecting a silence interval greater than or equal to a predetermined time. Thus, it cannot be determined as being completion of the utterance until a predetermined time elapses. This has caused a problem that the speech recognition response cannot be improved.

The present invention has been devised in view of this situation. An object of the present invention is to provide a speech recognition apparatus, a speech recognition method, and a computer program in which even when a speech recognition grammar is employed independently or alternatively even when an isolated word recognition grammar is employed together, the time point of completion of an utterance is identified at an early stage so that speech recognition response is improved. The present invention is implemented in the following embodiments.

Embodiment 1

FIG. 1 is a block diagram showing a configuration of a speech recognition apparatus 1 according to Embodiment 1 of the present invention. The speech recognition apparatus 1 comprises: controlling means 11 such as a CPU for controlling the entire apparatus; auxiliary storage means 12 such as a CD-ROM drive for reading various kinds of information from a recording media 102 such as a CD-ROM that records various kinds of information including data and a computer program 101 executable on the speech recognition apparatus 1 according to Embodiment 1 of the present invention; and recording means 13 such as a hard disk for recording various kinds of information read by the auxiliary storage means 12. When the controlling means 11 reads from the recording means 13 various kinds of information including data and a computer program 101 according to the present invention, then stores the information into storage means 14 such as a RAM for temporarily storing information, and then executes various kinds of procedures contained in the computer program 101, the computer serves as the speech recognition apparatus 1 according to the present invention.

The recording means 13 comprises: a speech recognition language model storage section 131 that stores a language model for speech recognition; and a recognition vocabulary dictionary 132 that stores a recognition vocabulary corresponding to the language model. The speech recognition apparatus 1 further comprises: communication means 15 for performing data communication with the outside; input means 16 such as a keyboard and a mouse; recognition result output means 17 such as a CRT monitor and an LCD monitor; and voice data input means 18 such as a microphone and a microphone array.

Here, whether the recognition vocabulary is to be included in the language model is a matter of definition. That is, the recognition vocabulary may be included or not included. Further, the recognition result need not be output and displayed on the recognition result output means 17, and may be output through the communication means 15 to another device, an application, or the like that utilizes the recognition result. Furthermore, the voice data input means 18 is not limited to a microphone or the like, and may be any device for receiving the data through the communication means 15 from another device, an application, or the like. Alternatively, the data may be read from the recording means 13, the storage means 14, or the auxiliary storage means 12.

Figure 3:
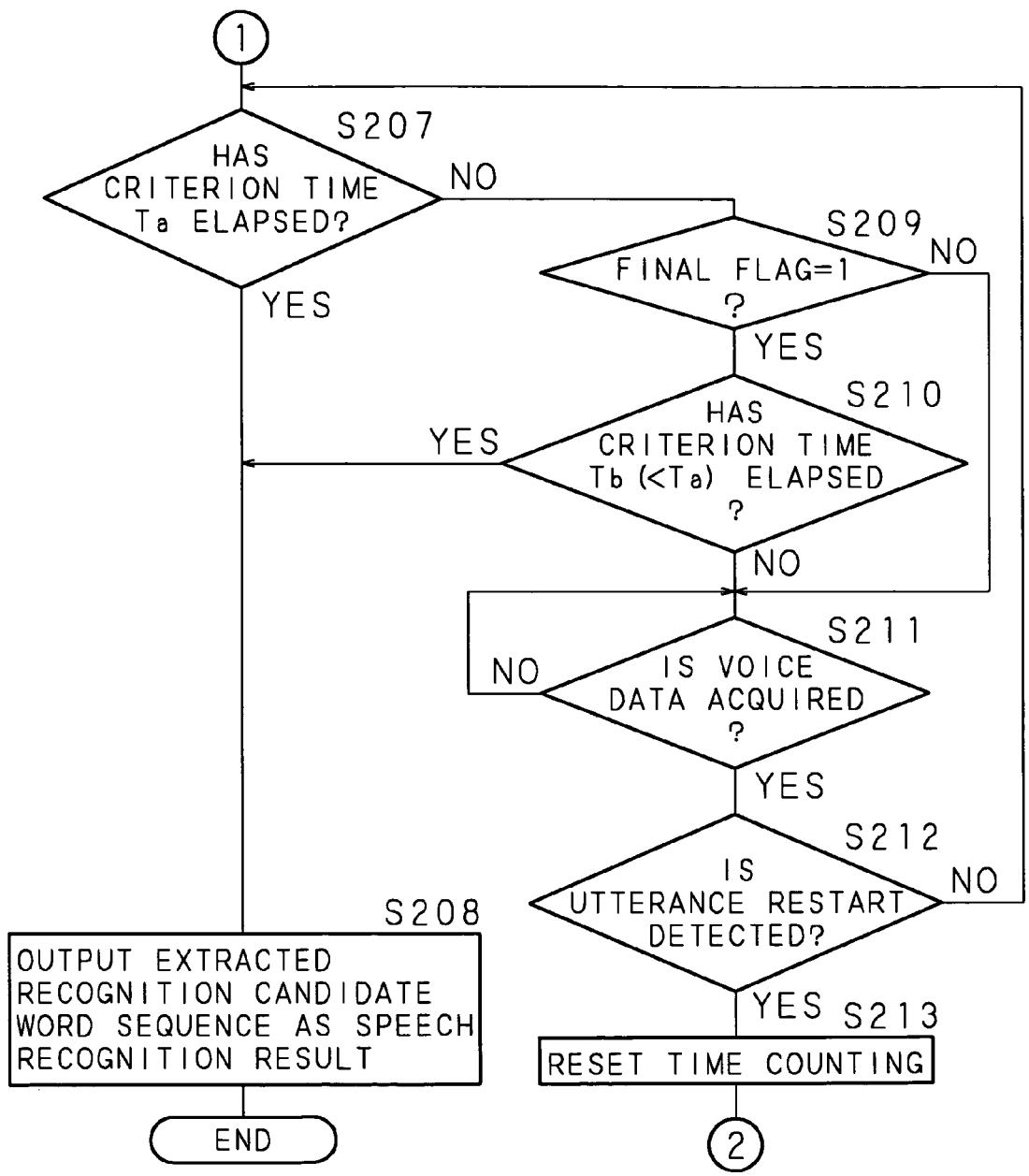
FIG. 3 is a flow chart showing a procedure of speech recognition processing performed by controlling means of a speech recognition apparatus according to Embodiment 1 of the present invention.

FIGS. 2 and 3 are flow charts showing a procedure of speech recognition processing performed by the controlling means 11 of the speech recognition apparatus 1 according to Embodiment 1 of the present invention. The controlling means 11 of the speech recognition apparatus 1 determines whether voice data has been acquired (step S201), so that the controlling means 11 waits until voice data is acquired (step S201: NO). The method of determining whether voice data has been received is not limited to a particular one. For example, the buffer residual amount of a sound device driver may be monitored continuously. Then, when data of an amount greater than or equal to a predetermined time is accumulated in the buffer, the data is read out. Otherwise, the data is not read out. According to this approach, whether voice data has been received can be determined on the basis of the buffer residual amount. Here, when the arithmetic processing load of recognition processing is heavy and hence causes a concern of overflow in the buffer, data stored in the buffer is read out at predetermined time intervals in many cases. However, even in this case, whether voice data has been received can be determined on the basis of whether a predetermined time has elapsed.

The controlling means 11 determines whether the start of an utterance has been detected from the acquired voice data (step S202). When the controlling means 11 determines that the start of an utterance is not yet detected (step S202: NO), the controlling means 11 returns the procedure to step S201. When the controlling means 11 determines that the start of an utterance has been detected (step S202: YES), the controlling means 11 determines whether voice data has been acquired continuously (step S203). When the controlling means 11 determines that voice data has been acquired (step S203: YES), the controlling means 11 determines whether a candidate of utterance completion has been detected (step S204). Here, the method of detecting the start of an utterance and a candidate of utterance completion is not limited a particular one. For example, the power of the received voice data may be measured continuously so that when the measured power of the voice data continuously exceeds a predetermined threshold for a predetermined time length, it may be determined that the start of an utterance has been detected. Further, when the measured power of the voice data remains below a predetermined threshold for a predetermined time length (for example, 0.2 second which is somewhat longer than the duration of a double consonant), it may be determined that a candidate of utterance completion has been detected.

When the controlling means 11 determines that a candidate of utterance completion is not yet detected (step S204: NO), the controlling means 11 waits for detection of a candidate of utterance completion. When the controlling means 11 determines that a candidate of utterance completion has been detected (step S204: YES), the controlling means 11 starts time counting of silence duration that follows the candidate of utterance completion, by using a timer, a clock, or the like which is build in (step S205). Further, with referring to the speech recognition grammar and the recognition vocabulary dictionary 132 recorded on the recording means 13, the controlling means 11 extracts a recognition candidate word sequence corresponding to the received voice data (step S206). Then, the controlling means 11 determines whether a criterion time Ta has elapsed, which is a time length sufficient for confirming that no utterance follows (that is, confirming the completion of the utterance) (step S207).

When the controlling means 11 determines that the criterion time Ta has elapsed (step S207: YES), the controlling means 11 concludes that the received utterance is the last utterance (the completion of the utterance has been confirmed), and thereby outputs the extracted recognition candidate word sequence as the speech recognition result (step S208). Here, when a recognition candidate word sequence is not yet extracted, in some cases, the controlling means 11 could determine that the utterance does not match with the language model (the utterance is unacceptable), and thereby output information indicating a recognition error. That is, when a subsequent utterance is present, a considerable limit time is present in the length of the silence interval located between the utterances. Thus, depending on the time length of the silence interval that continues after the received utterance, the controlling means 11 can determine whether the utterance has been completed.

In particular, in the case of connected word input, even when the presence of a silence interval is detected, the silence interval might merely be a-pause interval between voices. Thus, in order that the speech recognition result should be output rapidly, that is, the speech recognition response should be improved, if a short criterion time were adopted as the duration of a silence interval for determining whether the utterance has been completed, a concern could arise that the completion of the utterance is poor judged despite that the utterance is in the middle.

In order to avoid this situation, in the prior art, the criterion time Ta has been set into approximately 0.5 through 1.5 seconds so that when no subsequent utterance is detected within the criterion time Ta, it has been determined that the utterance has been completed. Thus, despite that the speech recognition result has been confirmed within the criterion time Ta, an output waiting state continues until the result is allowed to be output. This has caused difficulty in improving the speech recognition response.

In the present Embodiment 1, a final flag indicating whether the last voice or not is provided in a manner corresponding to the vocabulary of the speech recognition grammar, i.e., the voice recognition candidate word sequence. FIG. 4 is a diagram showing an example of a configuration of recognition vocabulary data in the case that the person name grammar shown in FIG. 11 is stored in the speech recognition language model storage section 131. As shown in FIG. 4, when a person's name is to be received as a voice, a surname (family name) part such as "Yamada" and "Tanaka" can be followed by a voice. In contrast, a given name (last name) part such as "Ichiro" and "Taro" is necessarily the last part of an utterance. Thus, a final flag '0' is imparted to each surname part, while a final flag '1' is imparted to each given name part. Here, it should be noted that the distinction of a surname and a given name is not indispensable in the present invention.

When the controlling means 11 determines that the criterion time Ta has not yet elapsed (step S207: NO), the controlling means 11 determines whether the final flag of the extracted recognition candidate word sequence is '1' (step S209). When the controlling means 11 determines that the final flag is '1' (step S209: YES), the controlling means 11 concludes that no utterance follows. Thus, the output of the speech recognition result need not be suspended for the criterion time Ta. Accordingly, the controlling means 11 determines whether a time Tb shorter than the criterion time Ta has elapsed (step S210). The time Tb is not limited to a particular value as long as it is shorter than the criterion time Ta. For example, the time Tb is set into 0.2 through 0.7 second.

When the controlling means 11 determines that the final flag is not '1' but '0' (step S209: NO), the controlling means 11 acquires further voice data (step S211: YES), and thereby determines whether the restart of the utterance has been detected (step S212). When the controlling means 11 determines that the restart of the utterance is not yet detected (step S212: NO), the controlling means 11 returns the procedure to step S207 and thereby repeats the processing described above. When the controlling means 11 determines that the restart of the utterance has been detected (step S212: YES), the controlling means 11 resets the time counting (step S213), then returns the procedure to step S203, and thereby repeats the processing described above.

When the controlling means 11 determines that the time Tb has not yet elapsed (step S210: NO), the controlling means 11 acquires further voice data (step S211: YES) and thereby determines whether the restart of the utterance has been detected (step S212). When the controlling means 11 determines that the restart of the utterance is not yet detected (step S212: NO), the controlling means 11 returns the procedure to step S207 and thereby repeats the processing described above. When the controlling means 11 determines that the restart of the utterance has been detected (step S212: YES), the controlling means 11 resets the time counting (step S213), then returns the procedure to step S203, and thereby repeats the processing described above.

When the controlling means 11 determines that the time Tb has elapsed (step S210: YES), the controlling means 11 outputs and displays the extracted recognition candidate word sequence as the speech recognition result, for example, onto the display means 17 (step S208).

According to the present Embodiment 1 described above, information is used that indicates whether the extracted recognition candidate word sequence can be the last word. This permits reliable detection that the received utterance is an utterance corresponding to a final word, i.e., the last word of the utterance included in the voice data to be received. Thus, the speech recognition result can be output without unnecessary waiting time.

Here, the information indicating whether capable of being the last word or not need not be stored in the form of one item of the speech recognition-grammar in a manner corresponding to the recognition candidate word sequence. That is, for example, when the speech recognition grammar is an isolated word recognition grammar, information indicating that the grammar is for isolated word recognition may be imparted to the grammar. Then, at the time of speech recognition, in the case that the controlling means 11 detects the presence of the information indicating that the grammar is for isolated word recognition, the entire recognition vocabulary within the grammar may be set to be capable of being the last word. Further, in addition to the grammar that indicates only the presence or absence of connected words as shown in FIG. 11, the language model may be a grammar in which their transition probability is added. Furthermore, a probabilistic model (for example, an N-gram) may be employed in place of the context-free grammar. When an N-gram is employed, in the case that N is greater than or equal to 2, a final word can be found from the information. Even in the case that N is 1, information indicating whether a final word or not may be stored in a manner corresponding to each word.

Further, when a plurality of recognition candidate word sequences are present, for the purpose of selecting a recognition candidate word sequence, the above-mentioned determination processing for the final flag may be performed only for a predetermined number of recognition candidate word sequences having highest evaluation score calculated by a well-known method such as a DP matching method and an HMM method, or alternatively only for recognition candidate word sequences having an evaluation score value within a predetermined range from the top evaluation score value among the recognition candidate word sequences or having an evaluation score value within the top N evaluation score values. This approach can reduce the concern that a pause interval is mistakenly determined as completion of the utterance on the basis of a mistaken recognition result candidate. For example, only when all of recognition candidate word sequences having an evaluation score value within the top N evaluation score values are final word candidates, the final flag may be set into '1'. This avoids the above-mentioned concern.

Further, the above-mentioned Embodiment 1 has been described for the case that a recognition candidate word sequence by speech recognition is extracted or output. However, it is sufficient that a recognition candidate is identified. That is, for example, a recognition candidate ID may be extracted or output.

Further, in the above-mentioned Embodiment 1, input voice data has been read successively, while an utterance start and an utterance completion have been detected only for a part determined as a speech segment. However, the present invention is not limited to this particular example. For example, the above-mentioned detection processing may be performed on the entire interval of the input voice data.

Embodiment 2

The following detailed description is given with reference to the drawings showing a speech recognition apparatus 1 according to Embodiment 2. The configuration of the speech recognition apparatus 1 according to Embodiment 2 of the present invention is similar to that of Embodiment 1. Thus, the same numerals are designated so that detailed description is omitted. The present Embodiment 2 is different from Embodiment 1 in the point that regardless of the presence or absence of a subsequent voice, an extracted recognition candidate word sequence is output to the outside at time Tb which is shorter than the criterion time Ta, and that when no voice has followed, confirmation of the already output recognition candidate word sequence is merely notified to the outside so that the speech recognition result is output at an early stage in correspondence to the early-stage output of the speech recognition result.

Figure 5:
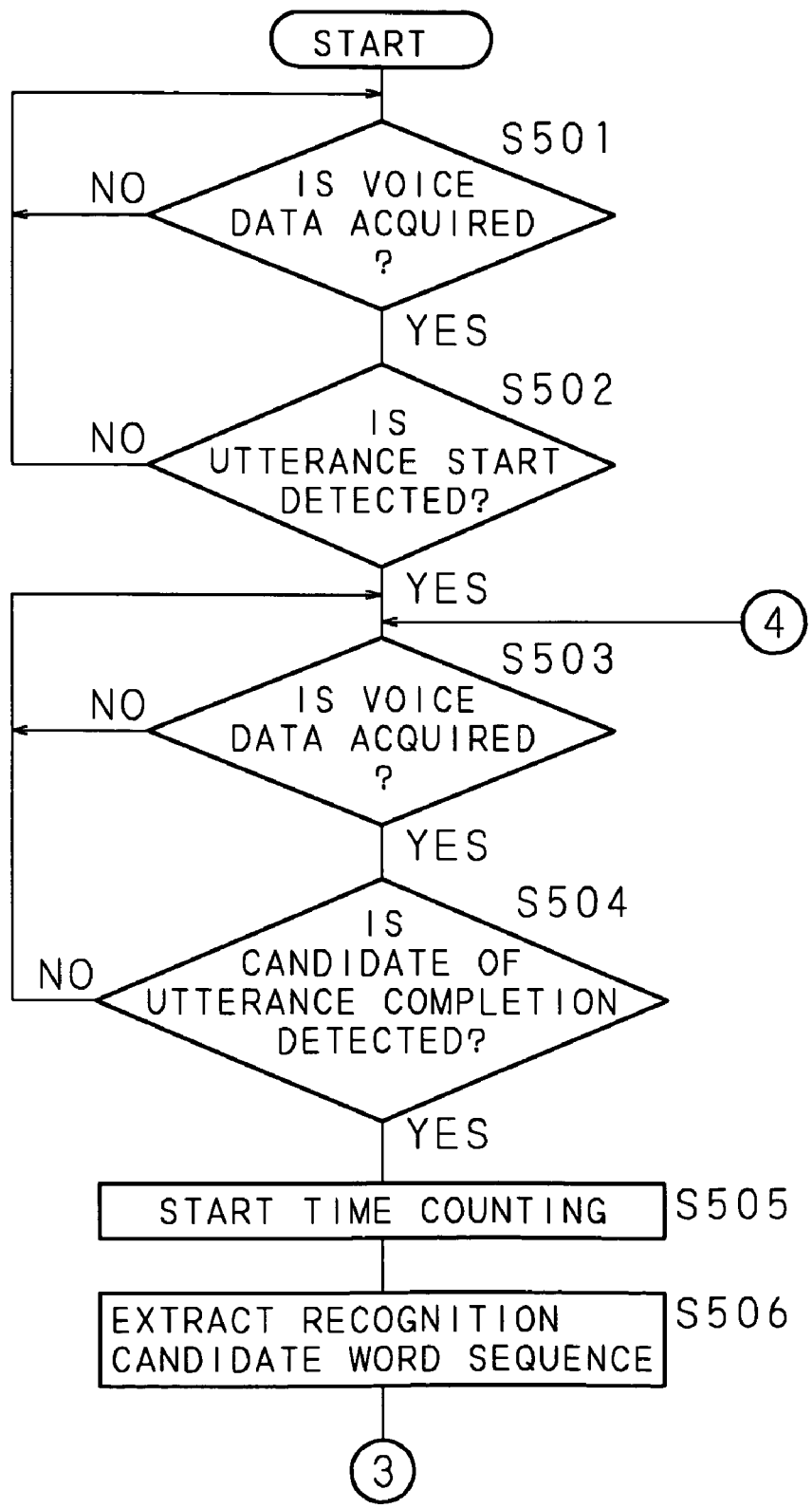
FIG. 5 is a flow chart showing a procedure of speech recognition processing performed by controlling means of a speech recognition apparatus according to Embodiment 2 of the present invention.
Figure 6:
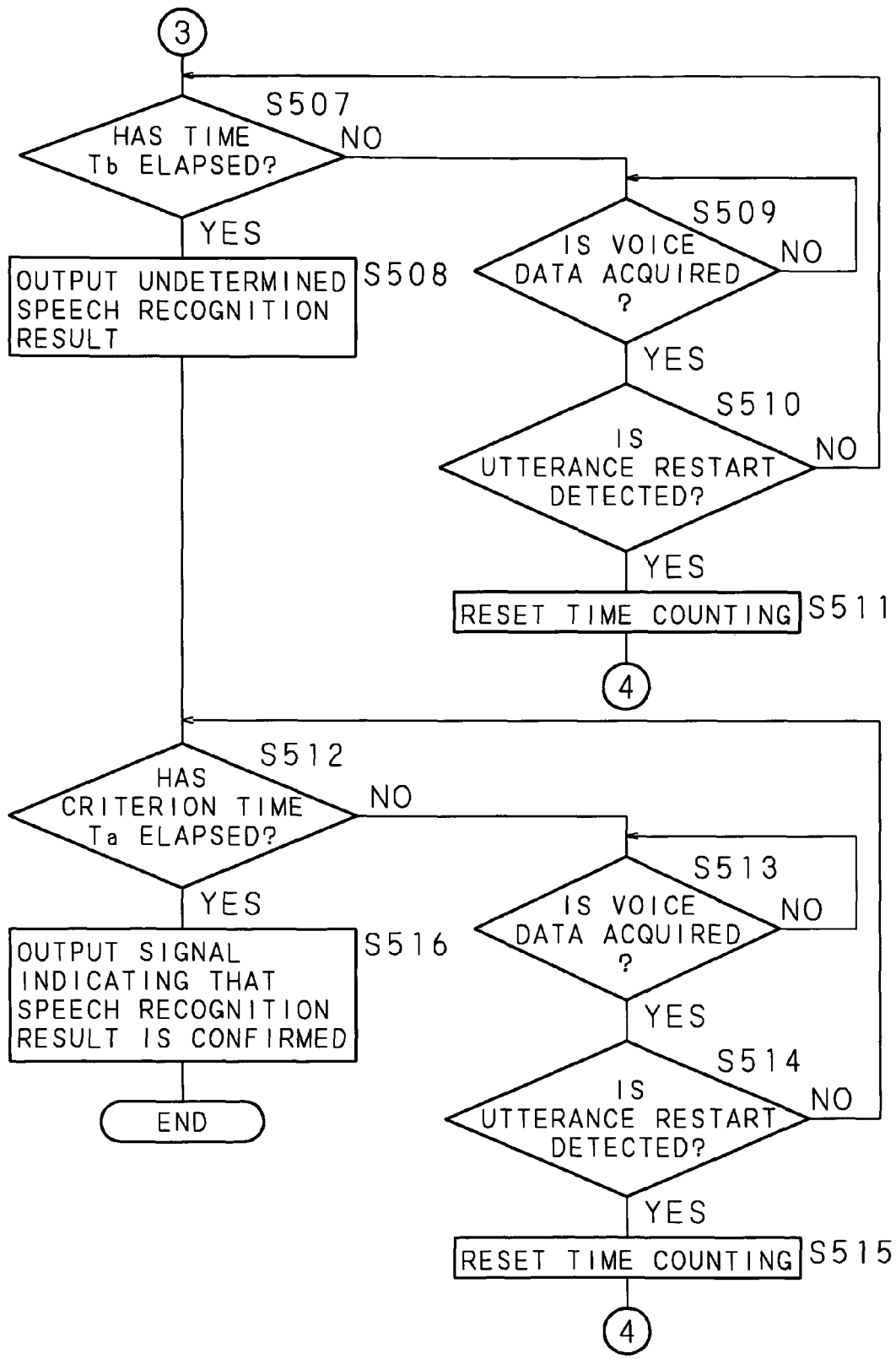
FIG. 6 is a flow chart showing a procedure of speech recognition processing performed by controlling means of a speech recognition apparatus according to Embodiment 2 of the present invention.

FIGS. 5 and 6 are flow charts showing a procedure of speech recognition processing performed by the controlling means 11 of the speech recognition apparatus 1 according to Embodiment 2 of the present invention. The controlling means 11 of the speech recognition apparatus 1 determines whether voice data has been acquired (step S501), so that the controlling means 11 waits until voice data is acquired (step S501: NO). The method of determining whether voice data has been received is not limited to a particular one.

The controlling means 11 determines whether the start of an utterance has been detected from the acquired voice data (step S502). When the controlling means 11 determines that the start of an utterance is not yet detected (step S502: NO), the controlling means 11 returns the procedure to step S501. When the controlling means 11 determines that the start of an utterance has been detected (step S502: YES), the controlling means 11 then determines whether voice data has been acquired (step S503). When the controlling means 11 determines that voice data has been acquired (step S503: YES), the controlling means 11 determines whether a candidate of utterance completion has been detected (step S504). Here, the method of detecting the start of an utterance and a candidate of utterance completion is not limited a particular one. For example, the power of the received voice data may be measured continuously so that when the measured power of the voice data continuously exceeds a predetermined threshold for a predetermined time length, it may be determined that the start of an utterance has been detected. Further, when the measured power of the voice data remains below a predetermined threshold for a predetermined time length (for example, 0.2 second which is somewhat-longer than the duration of a double consonant), it may be determined that a candidate of utterance completion has been detected.

When the controlling means 11 determines that a candidate of utterance completion is not-yet detected (step S504: NO), the controlling means 11 waits for detection of a candidate of utterance completion. When the controlling means 11 determines that a candidate of utterance completion has been detected (step S504: YES), the controlling means 11 starts time counting of silence duration that follows the candidate of utterance completion, by using a timer, a clock, or the like which is build in (step S505). Further, with referring to the speech recognition grammar and the recognition vocabulary dictionary 132 recorded on the recording means 13, the controlling means 11 extracts a recognition candidate word sequence corresponding to the received voice data (step S506). Then, the controlling means 11 determines whether a time Tb has elapsed, which is shorter than the criterion time Ta sufficient for confirming that no voice follows (step S507).

When the controlling means 11 determines that the time Tb has elapsed (step S507: YES), regardless of whether the received utterance is a final word, the controlling means 11 outputs a recognition candidate word sequence having the best score at the time point as an undetermined speech recognition result (step S508). That is, regardless of whether a subsequent utterance is present, the speech recognition result is displayed on the display means 17, or transmitted to an external application, or the like. This allows a user to check a candidate of the speech recognition result although the result is undetermined yet. Here, when a recognition candidate word sequence has already been output, the new recognition candidate word sequence may be compared with the preceding one, and may then be output only when different.

When the controlling means 11 determines that the time Tb has not yet elapsed (step S507: NO), the controlling means 11 acquires further voice data (step S509: YES) and thereby determines whether the restart of the utterance has been detected (step S510). When the controlling means 11 determines that the restart of the utterance is not yet detected (step S510: NO), the controlling means 11 returns the procedure to step S507 and thereby repeats the processing described above. When the controlling means 11 determines that the restart of the utterance has been detected (step S510: YES), the controlling means 11 resets the time counting (step S511), then returns the procedure to step S503, and thereby repeats the processing described above.

The controlling means 11 determines whether the criterion time T has elapsed (step S512). When the controlling means 11 determines that the criterion time Ta has not yet elapsed (step S512: NO), the controlling means 11 acquires further voice data (step S513: YES) and thereby determines whether the restart of the utterance has been detected (step S514). When the controlling means 11 determines that the restart of the utterance is not yet detected (step S514: NO), the controlling means 11 returns the procedure to step S512 and thereby repeats the processing described above. When the controlling means 11 determines-that the restart of the utterance has been detected (step. S514: YES), the controlling means 11 resets the time counting (step S515), then returns the procedure to step S503, and thereby repeats the processing described above.

When the controlling means 11 determines that the criterion time Ta has elapsed (step S512: YES), the controlling means 11 concludes that no subsequent utterance follows, and thereby outputs a signal indicating that the speech recognition result has been confirmed (step S516). The external application having received the signal performs, for example, the processing of locking the update of the screen of the display means 17 and thereby confirming the speech recognition result, and thereby confirms the speech recognition result.

According to the present Embodiment 2 described above, regardless of whether it has been detected that the received utterance is an utterance corresponding to a final word, i.e., the last word of the utterance to be received, the speech recognition result is output at an early stage. Then, when it is detected as being an utterance corresponding to a final word, i.e., the last part of the utterance to be received, a confirmation signal is merely output. This allows the user to watch the speech recognition result at a relatively early stage, and hence improves the speech recognition response for the user. Further, in the case of not being an utterance corresponding to a final word, i.e., not being the last part of the utterance to be received, the output speech recognition result is updated. As a result, accuracy of the speech recognition result can be ensured with maintaining similar response to Embodiment 1.

Here, the present Embodiment 2 has been described for the case that the recognition candidate word sequence is extracted only at the time of detection of a candidate of utterance completion and that the timing of outputting the undetermined speech recognition result agrees with this. However, the present invention is not limited to this particular example. For example, the recognition candidate word sequence may be extracted in synchronization with the frame, and then output when the recognition candidate word sequence having the best score is updated.

Embodiment 3

The following detailed description is given with reference to the drawings showing a speech recognition apparatus 1 according to Embodiment 3. The configuration of the speech recognition apparatus 1 according to Embodiment 3 of the present invention is similar to that of Embodiment 1. Thus, the same numerals are designated so that detailed description is omitted. The present Embodiment 3 is different from Embodiment 1 in the point that the probability Pi (i is a natural number) of becoming a final word is statistically calculated and stored in a manner corresponding to each word group of the interval to be received as information in the form of a voice, that is, information for identifying, for example, the surname part and the given name part of a person name and the postal code, the city name, and the lot number of an address, and that the criterion time T for determining whether a subsequent character is present is then calculated on the basis of the calculated probability Pi. Here, the probability Pi may be calculated for each recognition vocabulary instead of each word group. Further, the probability may be common for all users, or may be distinct for each user. Alternatively, the probability may newly be calculated from the two kinds of probabilities, like the mean value of the two kinds of probabilities.

The value of probability Pi is stored in the form of one data item of the recognition vocabulary dictionary 132, and hence easily extracted in a manner corresponding to the word group corresponding to a word. Obviously, the method of storage of the probability Pi and the method of correspondence to the recognition vocabulary are not limited to this particular example.

Figure 7:
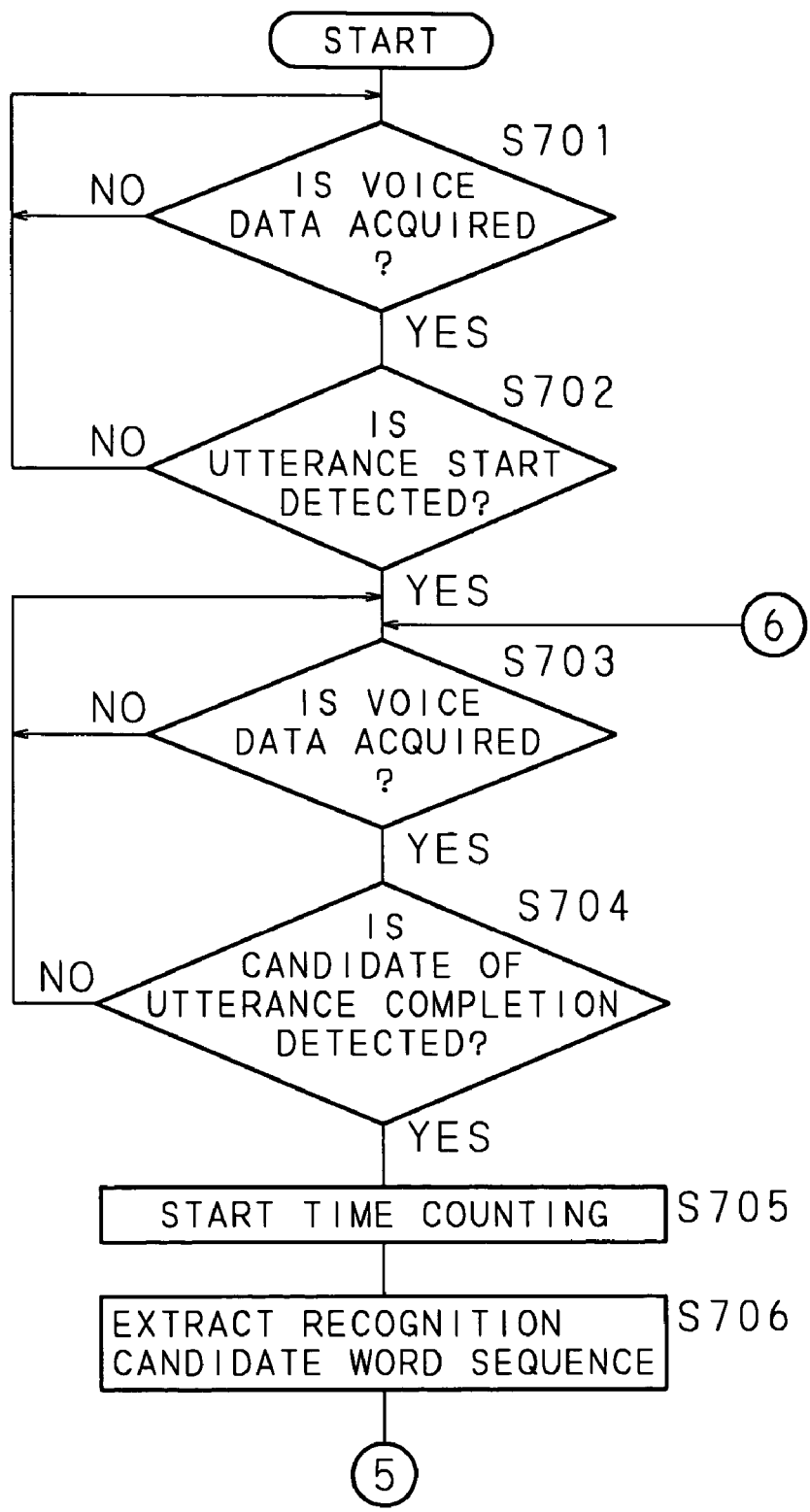
FIG. 7 is a flow chart showing a procedure of speech recognition processing performed by controlling means of a speech recognition apparatus according to Embodiment 3 of the present invention.
Figure 8:
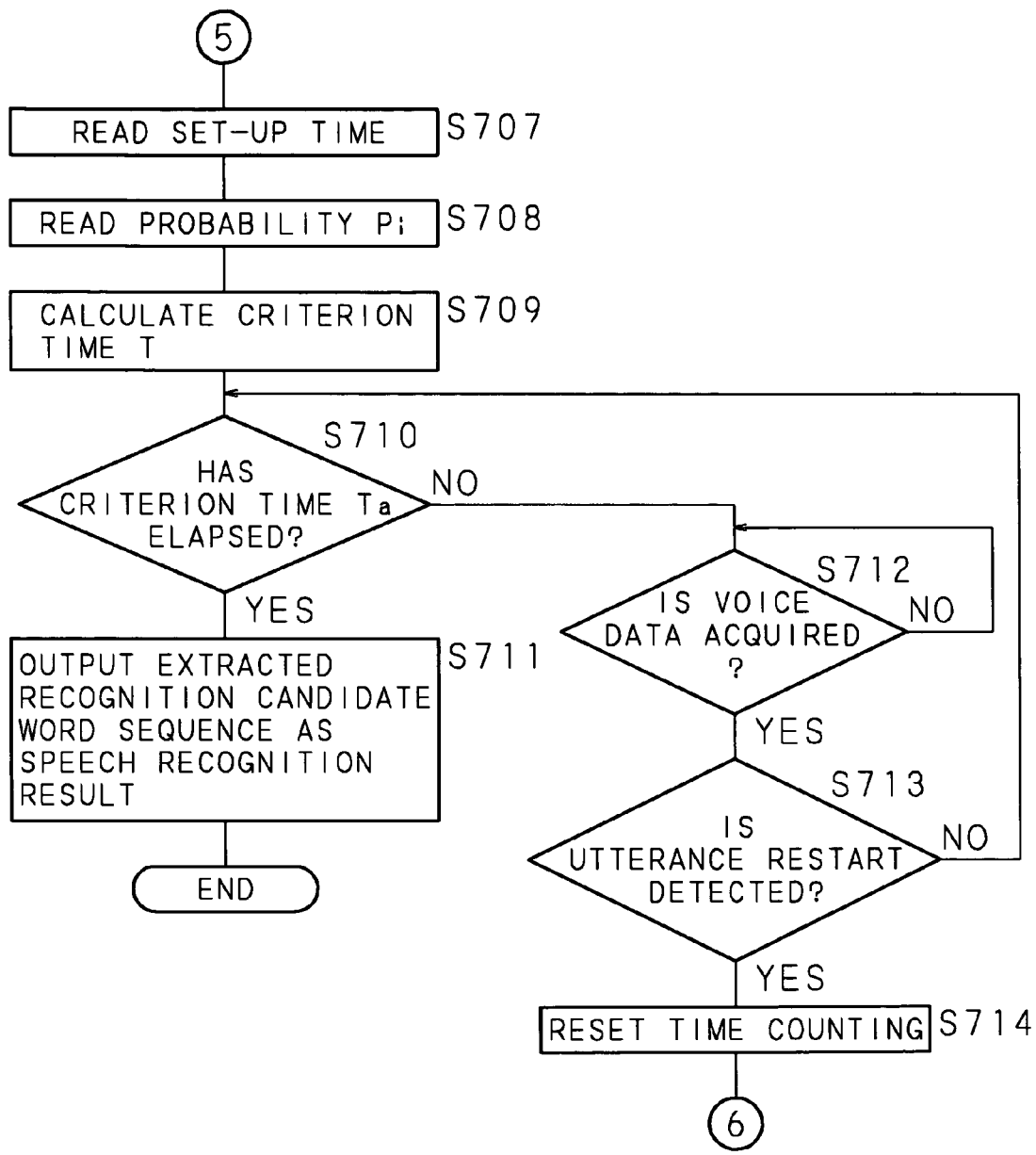
FIG. 8 is a flow chart showing a procedure of speech recognition processing performed by controlling means of a speech recognition apparatus according to Embodiment 3 of the present invention.

FIGS. 7 and 8 are flow charts showing a procedure of speech recognition processing performed by the controlling means 11 of the speech recognition apparatus 1 according to Embodiment 3 of the present invention. The controlling means 11 of the speech recognition apparatus 1 determines whether voice data has been acquired (step S701), so that the controlling means 11 waits until voice data is acquired (step S701: NO). The method of determining whether voice data has been received is not limited to a particular one.

The controlling means 11 determines whether the start of an utterance has been detected from the acquired voice data (step S702). When the controlling means 11 determines that the start of an utterance is not yet detected (step S702: NO), the controlling means 11 returns the procedure to step S701. When the controlling means 11 determines that the start of an utterance has been detected (step S702: YES), the controlling means 11 then determines whether voice data has been acquired (step S703). When the controlling means 11 determines that voice data has been acquired (step S703: YES), the controlling means 11 determines whether a candidate of utterance completion has been detected (step S704). Here, the method of detecting the start of an utterance and a candidate of utterance completion is not limited a particular one. For example, the power of the received voice data may be measured continuously so that when the measured power of the voice data continuously exceeds a predetermined threshold for a predetermined time length, it may be determined that the start of an utterance has been detected. Further, when the measured power of the voice data remains below a predetermined threshold for a predetermined time length (for example, 0.2 second which is somewhat longer than the duration of a double consonant), it may be determined that a candidate of utterance completion has been detected.

When the controlling means 11 determines that a candidate of utterance completion is not yet detected (step S704: NO), the controlling means 11 waits for detection of a candidate of utterance completion. When the controlling means 11 determines that a candidate of utterance completion has been detected (step S704: YES), the controlling means 11 starts time counting of silence duration that follows the candidate of utterance completion, by using a timer, a clock, or the like which is build in (step S705). Further, with referring to the speech recognition grammar and the recognition vocabulary dictionary 132 recorded on the recording means 13, the controlling means 11 extracts a recognition candidate word sequence corresponding to the received voice data (step S706).

On the basis of the extracted recognition candidate word sequence, the controlling means 11 reads from the storage means 14 a set-up time for determining whether a subsequent character is present (step S707). Then, on the basis of the word group of the recognition candidate word sequence, the controlling means 11 reads from the storage means 14 the probability Pi (i is a natural number) of becoming a final word (step S708), and then calculates the criterion time T for determining whether a subsequent character is present on the basis of the read-out probability Pi (i is a natural number) and the set-up time for each recognition candidate word sequence (step S709). The method of calculating the criterion time T is not limited to a particular one.

For example, when the recognition grammar is a "person name" while a voice consisting solely of a surname (family name) part is received as a word group, the probability Pi that the given name (last name) part becomes a final word is ($0 \leq Pi \leq 1$), while the probability that the surname (family name) part becomes a final word is (1−Pi). Thus, when the criterion time used in the case of determination as being the last voice is denoted by Tb while the criterion time used in the case of determination as not being the last voice is denoted by Ta (Ta>Tb), the criterion time T used as the waiting time for determining whether being actually the last voice is calculated according to (Formula 1).

$$T = Pi \cdot Tb + (1-Pi) \cdot Ta \qquad \text{(Formula 1)}$$

The controlling means 11 determines whether the criterion time T has elapsed (step S710). When the controlling means 11 determines that the criterion time T has not yet elapsed (step S710: NO), the controlling means 11 acquires further voice data (step S712: YES), and thereby determines whether the restart of the utterance has been detected (step S713). When the controlling means 11 determines that the restart of the utterance is not yet detected (step S713: NO), the controlling means 11 returns the procedure to step S710 and thereby repeats the processing described above. When the controlling means 11 determines that the restart of the utterance has been detected (step S713: YES), the controlling means 11 resets the time counting (step S714), then returns the procedure to step S703, and thereby repeats the processing described above.

When the controlling means 11 determines that the criterion time T has elapsed (step S710: YES), the controlling means 11 concludes that no voice follows, and thereby outputs the extracted recognition candidate word sequence as the speech recognition result, for example, to the display means 17 (step S711).

According to the present Embodiment 3 described above, the criterion time for determining whether being a final word is varied in accordance with the probability that the utterance included in acquired voice data can become a final word in a recognition grammar. Thus, the speech recognition result can be output in a waiting time adapted to the actual condition.

Embodiment 4

The following detailed description is given with reference to the drawings showing a speech recognition apparatus 1 according to Embodiment 4. The configuration of the speech recognition apparatus 1 according to Embodiment 4 of the present invention is similar to that of Embodiment 1. Thus, the same numerals are designated so that detailed description is omitted. The present Embodiment 4 is different from Embodiment 1 in the point that when the word group of an interval to be received as information in the form of a voice is the word at the last end of a recognition candidate word sequence, the criterion time T for determining whether being actually the last voice is stored for each word group. Here, the criterion time T need not be stored for each word group, and may be stored for each recognition vocabulary.

Figure 9:
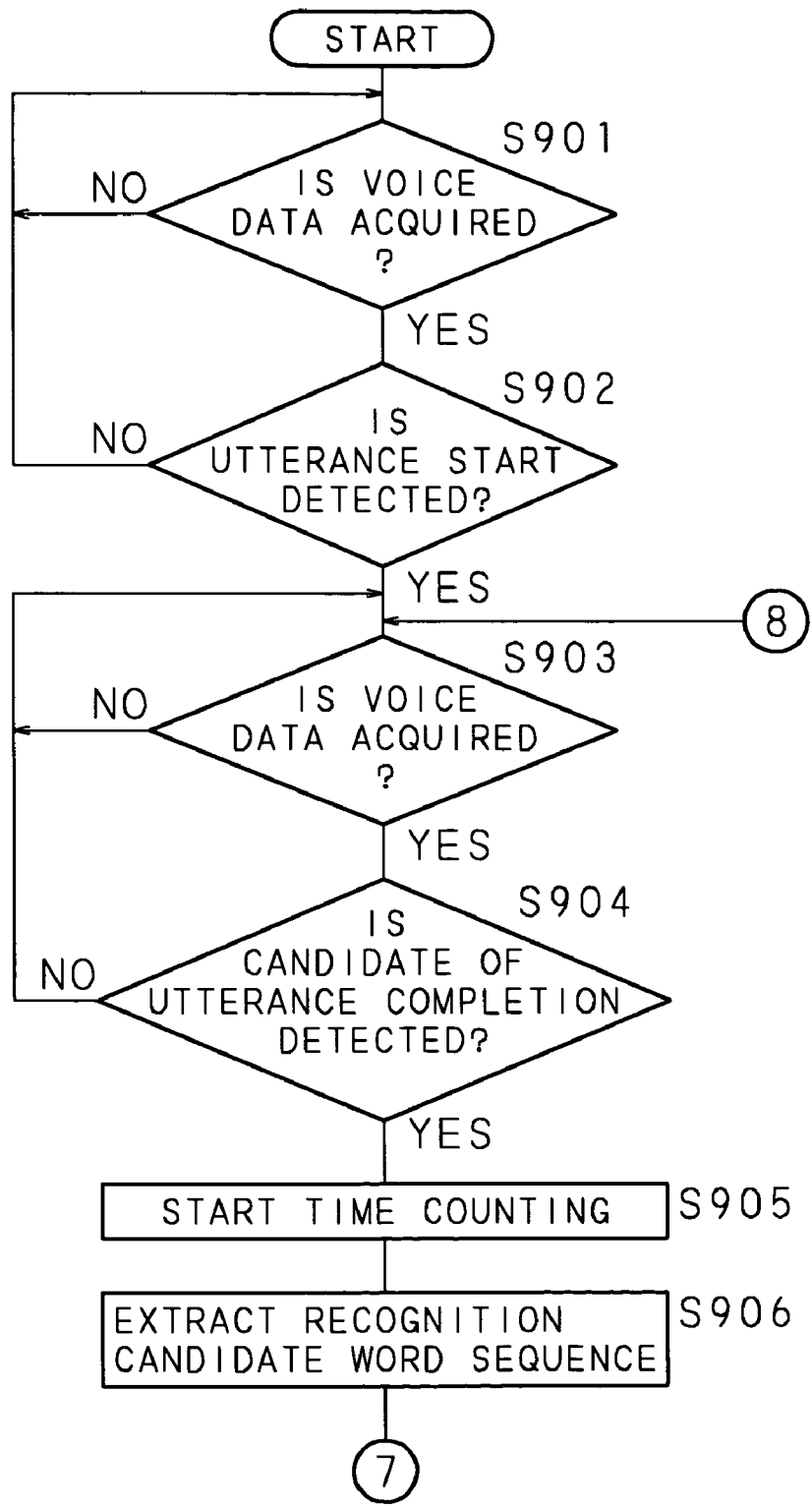
FIG. 9 is a flow chart showing a procedure of speech recognition processing performed by controlling means of a speech recognition apparatus according to Embodiment 4 of the present invention.
Figure 10:
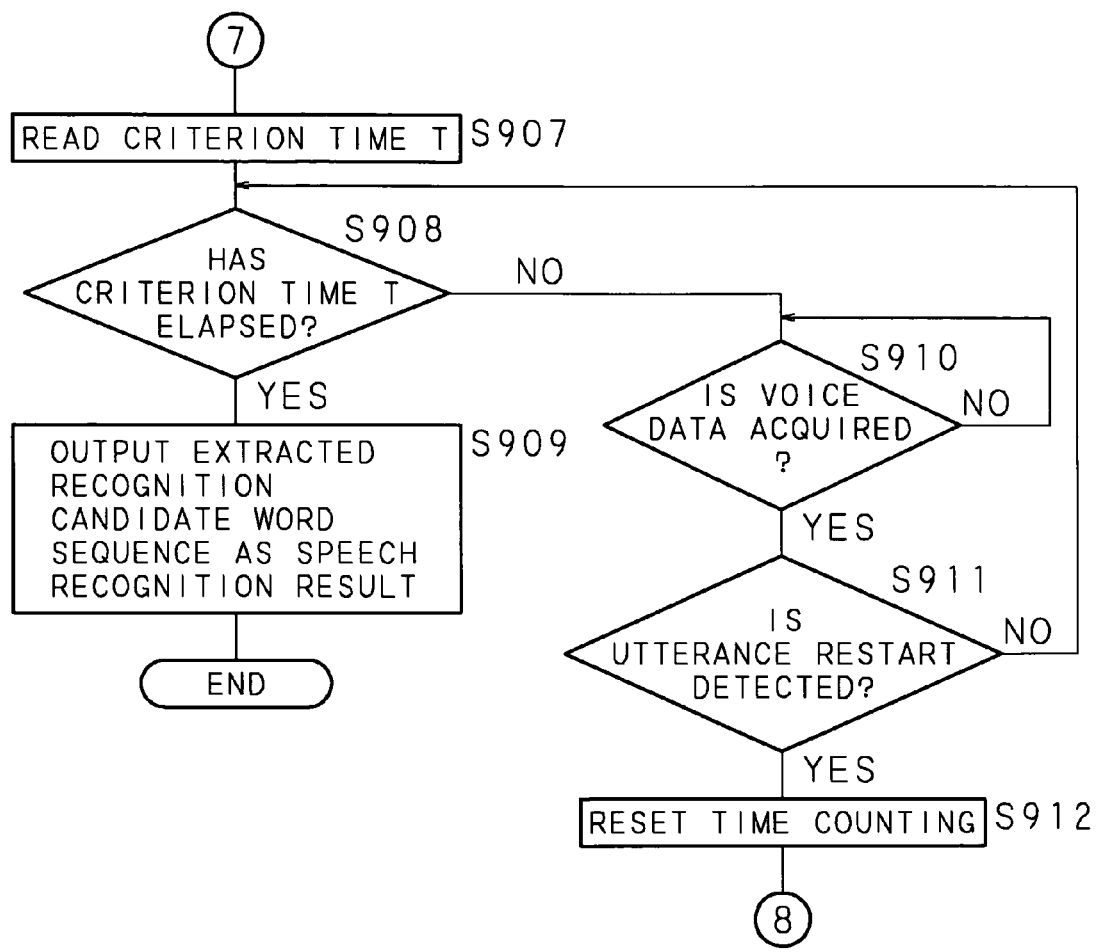
FIG. 10 is a flow chart showing a procedure of speech recognition processing performed by controlling means of a speech recognition apparatus according to Embodiment 4 of the present invention.

FIGS. 9 and 10 are flow charts showing a procedure of speech recognition processing performed by the controlling means 11 of the speech recognition apparatus 1 according to Embodiment 4 of the present invention. The controlling means 11 of the speech recognition apparatus 1 determines whether voice data has been acquired (step S901), so that the controlling means 11 waits until voice data is acquired (step S901: NO). The method of determining whether voice data has been received is not limited to a particular one.

The controlling means 11 determines whether the start of an utterance has been detected from the acquired voice data (step S902). When the controlling means 11 determines that the start of an utterance is not yet detected (step S902: NO), the controlling means 11 returns the procedure to step S901. When the controlling means 11 determines that the start of an utterance has been detected (step S902: YES), the controlling means 11 then determines whether voice data has been acquired (step S903). When the controlling means 11 determines that voice data has been acquired (step S903: YES), the controlling means 11 determines whether a candidate of utterance completion has been detected (step S904). Here, the method of detecting the start of an utterance and a candidate of utterance completion is not limited a particular one. For example, the power of the received voice data may be measured continuously so that when the measured power of the voice data continuously exceeds a predetermined threshold for a predetermined time length, it may be determined that the start of an utterance has been detected. Further, when the measured power of the voice data remains below a predetermined threshold for a predetermined time length (for example, 0.2 second which is somewhat longer than the duration of a double consonant), it may be determined that a candidate of utterance completion has been detected.

When the controlling means 11 determines that a candidate of utterance completion is not yet detected (step S904: NO), the controlling means 11 waits for detection of a candidate of utterance completion. When the controlling means 11 determines that a candidate of utterance completion has been detected (step S904: YES), the controlling means 11 starts time counting of silence duration that follows the candidate of utterance completion, by using a timer, a clock, or the like which is build in (step S905). Further, with referring to the speech recognition grammar and the recognition vocabulary dictionary 132 recorded on the recording means 13, the controlling means 11 extracts a recognition candidate word sequence corresponding to the received voice data (step S906).

On the basis of the extracted recognition candidate word sequence and the word group of the word at the last end, the controlling means 11 reads from the storage means 14 the criterion time T for determining whether a subsequent character is present (step S907). The controlling means 11 determines whether the criterion time T has elapsed (step S908).

When the controlling means 11 determines that the criterion time T has not yet elapsed (step S908: NO), the controlling means 11 acquires further voice data (step S910: YES), and thereby determines whether the restart of the utterance has been detected (step S911). When the controlling means 11 determines that the restart of the utterance is not yet detected (step S911: NO), the controlling means 11 returns the procedure to step S908 and thereby repeats the processing described above. When the controlling means 11 determines that the restart of the utterance has been detected (step S911: YES), the controlling means 11 resets the time counting (step S912), then returns the procedure to step S903, and thereby repeats the processing described above.

When the controlling means 11 determines that the criterion time T has elapsed (step S908: YES), the controlling means 11 concludes that no voice follows, and thereby outputs and displays the extracted recognition candidate word sequence as the speech recognition result, for example, onto the display means 17 (step S909).

According to the present Embodiment 4 described above, the criterion time is set up shorter for an utterance having no subsequent new voice data and hence having a higher probability of becoming an utterance corresponding to a final word, i.e., the last word of the utterance to be received. This allows the waiting time to be adjusted on the basis of the criterion time set up for each word group corresponding to the word at the last end of a recognition candidate word sequence. This improves the speech recognition response.

Here, in Embodiments 1 through 4 described above, the number of employed speech recognition grammars need not be unity. That is, for example, a connected word recognition grammar and an isolated word recognition grammar may be employed together. In this case, when the isolated word recognition grammar is used, the criterion time Tb is sufficient. However, when the connected word recognition grammar is used, the criterion time Ta is shortened such as to approach Tb by using the method of Embodiments 1 through 4 described above. Here, in the prior art speech recognition apparatus employing so-called multi-grammar, despite that an isolated word recognition grammar has been employed, the criterion time T was not capable of being shortened so that unnecessary waiting time has been generated even when an utterance of an isolated word was inputted. This is because the connected word recognition grammar has been employed together. However, when the speech recognition apparatus according to the present Embodiments 1 through 4 is employed, the speech recognition result can be output at an earlier stage.

Here, even in the case that a word is a final word when recognized by an individual speech recognition grammar, the same word can be a non-final word in some cases depending on the speech recognition grammar used simultaneously when recognized by multi-grammar. In order that determination errors caused by this ambiguity should be avoided, when a plurality of speech recognition grammars are employed together, it is preferable that whether each recognition vocabulary is a final word is determined in a state that all speech recognition grammars are integrated together into a single speech recognition grammar.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A speech recognition apparatus comprising:
    means for receiving voice data;
    means for determining whether duration of a silence interval that follows an utterance part has reached a criterion time for determining completion of an utterance;
    means for suspending output of a speech recognition result when determined as not yet having reached;
    language model storage means for storing information concerning a language model;
    storage means for storing a recognition candidate word sequence changed on the basis of a speech recognition grammar, and information indicating whether a last word of a word sequence is a final word;
    recognition candidate extracting means for extracting a recognition candidate word sequence corresponding to the received voice data, on the basis of said language model;
    final word determination means for determining whether a word at an utterance last end is a final word, from the extracted recognition candidate word sequence; and
    recognition result output means for outputting a speech recognition result in a time shorter than said criterion time when the final word determination means has determined as being a final word, and outputting a speech recognition result in case that new voice data is not present within said criterion time when determined as not being a final word.

2. The speech recognition apparatus according to claim 1, further comprising:
    means for determining whether the recognition candidate word sequence extracted by said recognition candidate extracting means is updated;
    recognition candidate output means for outputting said recognition candidate word sequence when determined as being updated;
    means for determining whether duration of a silence interval has reached said criterion time; and
    means for outputting a recognition candidate word sequence at a time point of reaching when determined as having reached.

3. A speech recognition apparatus comprising:
    means for receiving voice data;
    means for determining whether duration of a silence interval that follows an utterance part has reached a criterion time for determining completion of an utterance;
    means for suspending output of a speech recognition result when determined as not yet having reached;
    language model storage means for storing information concerning a language model;
    means for storing a recognition vocabulary included in said language model, classified in word groups;
    means for storing a last word of a recognition candidate word sequence, related to one of the word groups;
    means for storing probability of becoming a final word, for each of said word groups;
    recognition candidate extracting means for extracting a recognition candidate word sequence corresponding to the received voice data, on the basis of said language model;
    means for changing said criterion time on the basis of the probability that the last word of the extracted recognition candidate word sequence becomes the final word of the corresponding word group; and
    recognition result output means for outputting a speech recognition result when new voice data is not present within said criterion time.

4. A speech recognition apparatus comprising:
    means for receiving voice data;
    means for determining whether duration of a silence interval that follows an utterance part has reached a criterion time for determining completion of an utterance;
    means for suspending output of a speech recognition result when determined as not yet having reached;
    language model storage means for storing information concerning a language model;
    means for storing a recognition vocabulary included in said language model, classified in word groups;
    means for storing a last word of a recognition candidate word sequence, related to one of the word groups;
    means for storing said criterion time for each of said word groups;
    recognition candidate extracting means for extracting a recognition candidate word sequence corresponding to the received voice data, on the basis of said language model; and
    recognition result output means for outputting a speech recognition result when new voice data is not present within the criterion time of the word group corresponding to the last word of the extracted recognition candidate word sequence.

5. A speech recognition apparatus comprising a processor capable of performing the steps of:
    retrieving voice data;
    determining whether duration of a silence interval that follows an utterance part has reached a criterion time for determining completion of an utterance;
    suspending output of a speech recognition result when determined as not yet having reached;
    storing information concerning a language model;
    storing a recognition candidate word sequence changed on the basis of a speech recognition grammar, and information indicating whether a last word of a word sequence is a final word;
    extracting a recognition candidate word sequence corresponding to the received voice data, on the basis of said language model;
    determining whether a word at an utterance last end is a final word, from the extracted recognition candidate word sequence; and
    outputting a speech recognition result in a time shorter than said criterion time when determined as being a final word, and outputting a speech recognition result in case that new voice data is not present within said criterion time when determined as not being a final word.

6. The speech recognition apparatus according to claim 5, comprising a processor further capable of performing the steps of:
    determining whether the extracted recognition candidate word sequence is updated;
    outputting said recognition candidate word sequence when determined as being updated;
    determining whether duration of a silence interval has reached said criterion time; and
    outputting a recognition candidate word sequence at a time point of reaching when determined as having reached.

7. A speech recognition apparatus comprising a processor capable of performing the steps of:
    retrieving voice data;

determining whether duration of a silence interval that follows an utterance part has reached a criterion time for determining completion of an utterance;

suspending output of a speech recognition result when determined as not yet having reached;

storing information concerning a language model;

storing a recognition vocabulary included in said language model, classified in word groups;

storing a word at a last end of a recognition candidate word sequence, related to one of the word groups;

storing probability of becoming a final word, for each of said word groups;

extracting a recognition candidate word sequence corresponding to the retrieved voice data, on the basis of said language model;

changing said criterion time on the basis of the probability that the last word of the extracted recognition candidate word sequence becomes the final word of the corresponding word group; and outputting a speech recognition result when new voice data is not present within said criterion time.

8. A speech recognition apparatus comprising a processor capable of performing the steps of:

retrieving voice data;

determining whether duration of a silence interval that follows an utterance part has reached a criterion time for determining completion of an utterance;

suspending output of a speech recognition result when determined as not yet having reached;

storing information concerning a language model;

storing a recognition vocabulary included in said language model, classified in word groups;

storing a word at a last end of a recognition candidate word sequence, related to one of the word groups;

storing said criterion time for each of said word groups;

extracting a recognition candidate word sequence corresponding to the retrieved voice data, on the basis of said language model; and outputting a speech recognition result when new voice data is not present within the criterion time of the word group corresponding to the last word of the extracted recognition candidate word sequence.

9. A speech recognition method that makes a program cause a computer to function as a speech recognition apparatus, the speech recognition method comprising:

receiving voice data by the computer;

determining whether duration of a silence interval that follows an utterance part has reached a criterion time for determining completion of an utterance by the computer;

suspending output of a speech recognition result when determined as not yet having reached by the computer;

storing information concerning a language model by the computer;

storing a recognition candidate word sequence changed on the basis of a speech recognition grammar, and information indicating whether a last word of a word sequence is a final word by the computer;

extracting a recognition candidate word sequence corresponding to the received voice data, on the basis of said language model by the computer;

determining whether a word at an utterance last end is a final word, from the extracted recognition candidate word sequence by the computer; and outputting a speech recognition result in a time shorter than said criterion time when determined as being a final word, and outputting a speech recognition result in case that new voice data is not present within said criterion time when determined as not being a final word by the computer.

10. A speech recognition method that makes a program cause a computer to function as a speech recognition apparatus, the speech recognition method comprising:

receiving voice data by the computer;

determining whether duration of a silence interval that follows an utterance part has reached a criterion time for determining completion of an utterance by the computer;

suspending output of a speech recognition result when determined as not yet having reached by the computer;

storing information concerning a language model by the computer;

storing a recognition vocabulary included in said language model, classified in word groups by the computer;

storing a word at a last end of a recognition candidate word sequence, related to one of the word groups by the computer;

storing probability of becoming a final word, for each of said word groups by the computer;

extracting a recognition candidate word sequence corresponding to the received voice data, on the basis of said language model by the computer;

changing said criterion time on the basis of the probability that the word at the last end of the extracted recognition candidate word sequence becomes the final word of the corresponding word group by the computer; and outputting a speech recognition result when new voice data is not present within said criterion time by the computer.

11. A speech recognition method that makes a program cause a computer to function as a speech recognition apparatus, the speech recognition method comprising:

receiving voice data by the computer;

determining whether duration of a silence interval that follows an utterance part has reached a criterion time for determining completion of an utterance by the computer;

suspending output of a speech recognition result when determined as not yet having reached by the computer;

storing information concerning a language model by the computer;

storing a recognition vocabulary included in said language model, classified in word groups by the computer;

storing a word at a last end of a recognition candidate word sequence, related to one of the word groups by the computer;

storing said criterion time for each of said word groups by the computer;

extracting a recognition candidate word sequence corresponding to the received voice data, on the basis of said language model by the computer; and outputting a speech recognition result when new voice data is not present within the criterion time of the word group corresponding to the last word of the extracted recognition candidate word sequence by the computer.

12. A recording medium recorded with a computer program comprising the steps of:

causing a computer to receive voice data;

causing a computer to determine whether duration of a silence interval that follows an utterance part has reached a criterion time for determining completion of an utterance;

causing a computer to suspend output of a speech recognition result when determined as not yet having reached;

causing a computer to store information concerning a language model;

causing a computer to store a recognition candidate word sequence changed on the basis of a speech recognition grammar, and information indicating whether a last word of a word sequence is a final word;

causing a computer to extract a recognition candidate word sequence corresponding to the received voice data, on the basis of said language model;

causing a computer to determine whether a word at an utterance last end is a final word, from the extracted recognition candidate word sequence; and causing a computer to output a speech recognition result in a time shorter than said criterion time when determined as being a final word, and outputting a speech recognition result in case that new voice data is not present within said criterion time when determined as not being a final word.

13. A recording medium recorded with a computer program comprising the steps of:

causing a computer to receive voice data;

causing a computer to determine whether duration of a silence interval that follows an utterance part has reached a criterion time for determining completion of an utterance;

causing a computer to suspend output of a speech recognition result when determined as not yet having reached;

causing a computer to store information concerning a language model;

causing a computer to store a recognition vocabulary included in said language model, classified in word groups;

causing a computer to store a last word of a recognition candidate word sequence, related to one of the word groups;

causing a computer to store probability of becoming a final word, for each of said word groups;

causing a computer to extract a recognition candidate word sequence corresponding to the received voice data, on the basis of said language model;

causing a computer to change said criterion time on the basis of the probability that the last word of the extracted recognition candidate word sequence becomes the final word of the corresponding word group; and causing a computer to output a speech recognition result when new voice data is not present within said criterion time.

14. A recording medium recorded with a computer program comprising the steps of:

causing a computer to receive voice data;

causing a computer to determine whether duration of a silence interval that follows an utterance part has reached a criterion time for determining completion of an utterance;

causing a computer to suspend output of a speech recognition result when determined as not yet having reached;

causing a computer to store information concerning a language model;

causing a computer to store a recognition vocabulary included in said language model, classified in word groups;

causing a computer to store a last word of a recognition candidate word sequence, related to one of the word groups;

causing a computer to store said criterion time for each of said word groups;

causing a computer to extract a recognition candidate word sequence corresponding to the received voice data, on the basis of said language model; and causing a computer to output a speech recognition result when new voice data is not present within the criterion time of the word group corresponding to the last word of the extracted recognition candidate word sequence.

* * * * *